(12) United States Patent
Satterwhite (10) Patent No.: US 7,461,966 B2
(45) Date of Patent: Dec. 9, 2008

(54) METHOD OF OPERATING A HIGH PRESSURE CAVITATION CHAMBER WITH DUAL INTERNAL REFLECTORS

(75) Inventor: Richard D. Satterwhite, Grass Valley, CA (US)

(73) Assignee: Impulse Devices, Inc., Grass Valley, CA (US)

( * ) Notice: Subject to any disclaimer, the term of this patent is extended or adjusted under 35 U.S.C. 154(b) by 558 days.

(21) Appl. No.: 11/333,157

(22) Filed: Jan. 17, 2006

(65) Prior Publication Data

US 2007/0148008 A1    Jun. 28, 2007

Related U.S. Application Data

(63) Continuation of application No. 11/325,055, filed on Jan. 3, 2006, which is a continuation-in-part of application No. 11/305,786, filed on Dec. 16, 2005.

(51) Int. Cl.
    *B01F 11/00*    (2006.01)
(52) U.S. Cl. .................. 366/114; 366/115; 366/127; 366/139; 422/127; 422/128; 95/30; 95/266
(58) Field of Classification Search ............... 366/114, 366/115, 127, 139; 422/127, 128; 95/30, 95/266
    See application file for complete search history.

(56) References Cited

U.S. PATENT DOCUMENTS

| | | | | |
|---|---|---|---|---|
| 2,108,416 | A | * | 2/1938 | Smith et al. ............... 414/523 |
| 2,667,706 | A | * | 2/1954 | Morse et al. ............... 34/279 |
| 2,875,989 | A | * | 3/1959 | Toulmin .................... 366/114 |
| 3,113,761 | A | * | 12/1963 | Platzman .................. 366/115 |
| 3,516,645 | A | * | 6/1970 | Arndt et al. ............... 366/115 |
| 4,333,796 | A | | 6/1982 | Flynn |
| 4,339,247 | A | | 7/1982 | Faulkner et al. |

(Continued)

FOREIGN PATENT DOCUMENTS

WO    PCT/US95/15972    7/1996

(Continued)

OTHER PUBLICATIONS

Blake et al, Acoustic Cavitation:The Fluid Dynamics of Non-Spherical Bubbles, Phil. Trans. R. Soc. Lond. A, 1999, pp. 251-267, vol. 357, Publisher: The Royal Society, Published in: Great Britain.*

(Continued)

*Primary Examiner*—David L Sorkin
(74) *Attorney, Agent, or Firm*—C. Brandon Browning; Maynard, Cooper & Gale, P.C.

(57) ABSTRACT

A method of operating a cavitation system in which the cavitation chamber is separated into at least three distinct chamber volumes by, for example, first fabricating and then installing a pair of gas-tight and liquid-tight seals into the cavitation chamber, is provided. Each chamber volume seal is fabricated from a rigid reflector and a flexible member. During chamber operation, only one of the three volumes contains cavitation fluid, the other two chamber volumes remaining devoid of cavitation fluid. By controlling the pressure within the two unfilled chamber volumes, the rigid reflectors can be used as a means of increasing the static pressure within the fluid-filled chamber volume.

14 Claims, 7 Drawing Sheets

U.S. PATENT DOCUMENTS

| | | | |
|---|---|---|---|
| 4,563,341 | A | 1/1986 | Flynn |
| 4,991,152 | A | 2/1991 | Letiche |
| 5,030,873 | A | 7/1991 | Owen |
| 5,658,534 | A | 8/1997 | Desborough et al. |
| 5,659,173 | A | 8/1997 | Putterman et al. |
| 5,722,444 | A | 3/1998 | Prokopenko et al. |
| 5,858,104 | A | 1/1999 | Clark |
| 5,968,323 | A | 10/1999 | Pless |
| 5,994,818 | A | 11/1999 | Abramov et al. |
| 5,998,908 | A | 12/1999 | Goodson |
| 6,361,747 | B1 | 3/2002 | Dion et al. |
| 6,617,765 | B1 | 9/2003 | Lagler |
| 6,690,621 | B2 | 2/2004 | Porzio |
| 2002/0090047 | A1 | 7/2002 | Stringham |

FOREIGN PATENT DOCUMENTS

| | | | |
|---|---|---|---|
| WO | WO 01/39200 | * | 5/2001 |
| WO | PCT/US02/16761 | | 12/2002 |
| WO | PCT/CA03/00342 | | 9/2003 |

OTHER PUBLICATIONS

M. Dan et al., Ambient Pressure Effect on Single-Bubble Sonoluminescence, Physical Review Letters, Aug. 30, 1999, pp. 1870-1873, vol. 83, No. 9, Publisher: The American Physical Society, Published in: US.*

Moss et al., Computed Optical Emissions from a Sonoluminescing Bubble, Physical Review E, Mar. 1999, pp. 2986-2992, vol. 59, No. 3, Published in: US.*

Y.T. Didenko et al., Effect of Noble Gases on Sonoluminescence Temperatures during Multibubble Cavitation, Physical Review Letters, Jan. 24, 2000, pp. 777-780, vol. 84, No. 4, Publisher: The American Physical Society, Published in: US.*

Gaitan et al, Experimental Observations of Bubble Response and Light Intensity Near the Threshold for Single Bubble Sonoluminescence, Physical Review E, May 1999, pp. 5495-5502, vol. 59, No. 5, Published in: US.*

Barber et al, Sensitivity of Sonoluminescence to Experimental Parameters, Physical Review Letters, Feb. 28, 1994, pp. 1380-1382, vol. 72, No. 9, Published in: US.*

F.R. Young, Sonoluminescence from Water Containing Dissolved Gases, J. Acoust. Soc. Am., Jul. 1996, pp. 100-104, vol. 60, No. 1, Publisher: Acoustical Society of America, Published in: US.*

Putterman, Sonoluminescence:Sound Into Light, Scientific American, Feb. 1995, pp. 46-51.*

Gaitan et al, Sonoluminescence and Bubble Dynamics for a Single, Stable, Cavitation Bubble, J. Acoust. Soc. Am., Jun. 1992, pp. 3166-3183, vol. 91, No. 6, Publisher: Acoustical Society of America, Published in; US.*

Crum, Sonoluminescence, Physics Today, Sep. 1994, pp. 22-29, Publisher: American Institute of Physics, Published in: US.*

A. Chakravarty et al., Stable Sonoluminescence Within a Water Hammer Tube, Physical Review E, Jun. 24, 2004, pp. 1-8, vol. 69, No. 066317, Publisher: The American Physical Society, Published in: US.*

Bollinger, Ultra Cavitation, http://wiretap.area.com/Gopher/Library/Article/Sci/cavitate.ult, Sep. 17, 2001, pp. 1-26.*

* cited by examiner

METHOD OF OPERATING A HIGH PRESSURE CAVITATION CHAMBER WITH DUAL INTERNAL REFLECTORS

CROSS-REFERENCES TO RELATED APPLICATIONS

This application is a continuation of U.S. patent application Ser. No. 11/325,055, filed Jan. 3, 2006, which is a continuation-in-part of U.S. patent application Ser. No. 11/305,786, filed Dec. 16, 2005, the disclosure of which is incorporated herein by reference for any and all purposes.

FIELD OF THE INVENTION

The present invention relates generally to sonoluminescence and, more particularly, to a method and apparatus for performing high pressure cavitation.

BACKGROUND OF THE INVENTION

Sonoluminescence is a well-known phenomena discovered in the 1930's in which light is generated when a liquid is cavitated. Although a variety of techniques for cavitating the liquid are known (e.g., spark discharge, laser pulse, flowing the liquid through a Venturi tube), one of the most common techniques is through the application of high intensity sound waves.

In essence, the cavitation process consists of three stages; bubble formation, growth and subsequent collapse. The bubble or bubbles cavitated during this process absorb the applied energy, for example sound energy, and then release the energy in the form of light emission during an extremely brief period of time. The intensity of the generated light depends on a variety of factors including the physical properties of the liquid (e.g., density, surface tension, vapor pressure, chemical structure, temperature, hydrostatic pressure, etc.) and the applied energy (e.g., sound wave amplitude, sound wave frequency, etc.).

Although it is generally recognized that during the collapse of a cavitating bubble extremely high temperature plasmas are developed, leading to the observed sonoluminescence effect, many aspects of the phenomena have not yet been characterized.

As such, the phenomena is at the heart of a considerable amount of research as scientists attempt to not only completely characterize the phenomena (e.g., effects of pressure on the cavitating medium), but also its many applications (e.g., sonochemistry, chemical detoxification, ultrasonic cleaning, etc.).

In a typical cavitation system, for example as shown by Dan et al. in an article entitled *Ambient Pressure Effect on Single-Bubble Sonoluminescence* (vol. 83, no. 9 of Physical Review Letters), the cavitation chamber is a simple glass flask that is filled or semi-filled with cavitation fluid. A spherical flask is also disclosed in U.S. Pat. No. 5,659,173. The specification of this patent discloses using flasks of Pyrex®, Kontes®, and glass with sizes ranging from 10 milliliters to 5 liters. The drivers as well as a microphone piezoelectric were epoxied to the exterior surface of the chamber.

In some instances, more elaborate chambers are employed in the cavitation system. For example, U.S. Pat. No. 4,333,796 discloses a cavitation chamber designed for use with a liquid metal. As disclosed, the chamber is generally cylindrical and comprised of a refractory metal such as tungsten, titanium, molybdenum, rhenium or some alloy thereof. Surrounding the cavitation chamber is a housing which is purportedly used as a neutron and tritium shield. Projecting through both the outer housing and the cavitation chamber walls are a number of acoustic horns, each of the acoustic horns being coupled to a transducer which supplies the mechanical energy to the associated horn. The specification discloses that the horns, through the use of flanges, are secured to the chamber/housing walls in such a way as to provide a seal and that the transducers are mounted to the outer ends of the horns.

A tube-shaped cavitation system is disclosed in U.S. Pat. No. 5,658,534, the tube fabricated from stainless steel. Multiple ultrasonic transducers are attached to the cavitation tube, each transducer being fixed to a cylindrical half-wavelength coupler by a stud, the coupler being clamped within a stainless steel collar welded to the outside of the sonochemical tube. The collars allow circulation of oil through the collar and an external heat exchanger.

Another tube-shaped cavitation system is disclosed in U.S. Pat. No. 6,361,747. In this cavitation system the acoustic cavitation reactor is comprised of a flexible tube. The liquid to be treated circulates through the tube. Electroacoustic transducers are radially and uniformly distributed around the tube, each of the electroacoustic transducers having a prismatic bar shape. A film of lubricant is interposed between the transducer heads and the wall of the tube to help couple the acoustic energy into the tube.

U.S. Pat. No. 5,858,104 discloses a shock wave chamber partially filled with a liquid. The remaining portion of the chamber is filled with gas which can be pressurized by a connected pressure source. Acoustic transducers are used to position an object within the chamber while another transducer delivers a compressional acoustic shock wave into the liquid. A flexible membrane separating the liquid from the gas reflects the compressional shock wave as a dilation wave focused on the location of the object about which a bubble is formed.

PCT Application No. US02/16761 discloses a nuclear fusion reactor in which at least a portion of the liquid within the reactor is placed into a state of tension, this state of tension being less than the cavitation threshold of the liquid. The liquid preferably includes enriched deuterium or tritium, the inventors citing deuterated acetone as an exemplary liquid. In at least one disclosed embodiment, acoustic waves are used to pretension the liquid. In order to minimize the effects of gas cushioning during bubble implosion, the liquid is degassed prior to tensioning. A resonant cavity is formed within the chamber using upper and lower pistons, the pistons preferably fabricated from glass. The upper and lower pistons are smaller than the inside diameter of the chamber, thus allowing cavitation fluid to pass by the pistons. In a preferred embodiment, the upper piston is flexibly anchored to the chamber using wire anchors while the lower piston is rigidly anchored to the chamber.

SUMMARY OF THE INVENTION

The present invention provides a method of operating a cavitation system in which the cavitation chamber is separated into at least three distinct chamber volumes by, for example, first fabricating and then installing a pair of gas-tight and liquid-tight seals into the cavitation chamber. Each chamber volume seal is fabricated from a rigid reflector and a flexible member. During chamber operation, only one of the three volumes contains cavitation fluid, the other two chamber volumes remaining devoid of cavitation fluid.

In order to prepare the system for cavitation, one of the three chamber volumes is filled with cavitation fluid, preferably from a cavitation fluid reservoir coupled to the cavitation chamber. Once filled, the system undergoes degassing. In at least one embodiment, during degassing the two unfilled chamber volumes are coupled together and coupled to a region of the cavitation fluid reservoir above the liquid free surface, thus allowing pressure equalization between these two volumes and the reservoir region. After degassing is complete, the chamber volume filled with cavitation fluid is isolated from the cavitation fluid reservoir and the two unfilled chamber volumes are decoupled from the reservoir region. Prior to driving cavitation within the filled chamber volume, the two unfilled chamber volumes are pressurized to a pressure greater than that of the filled volume, either by coupling the two unfilled regions to the ambient atmosphere or to a high pressure gas source.

A further understanding of the nature and advantages of the present invention may be realized by reference to the remaining portions of the specification and the drawings.

DESCRIPTION OF THE SPECIFIC EMBODIMENTS

Figure 1:
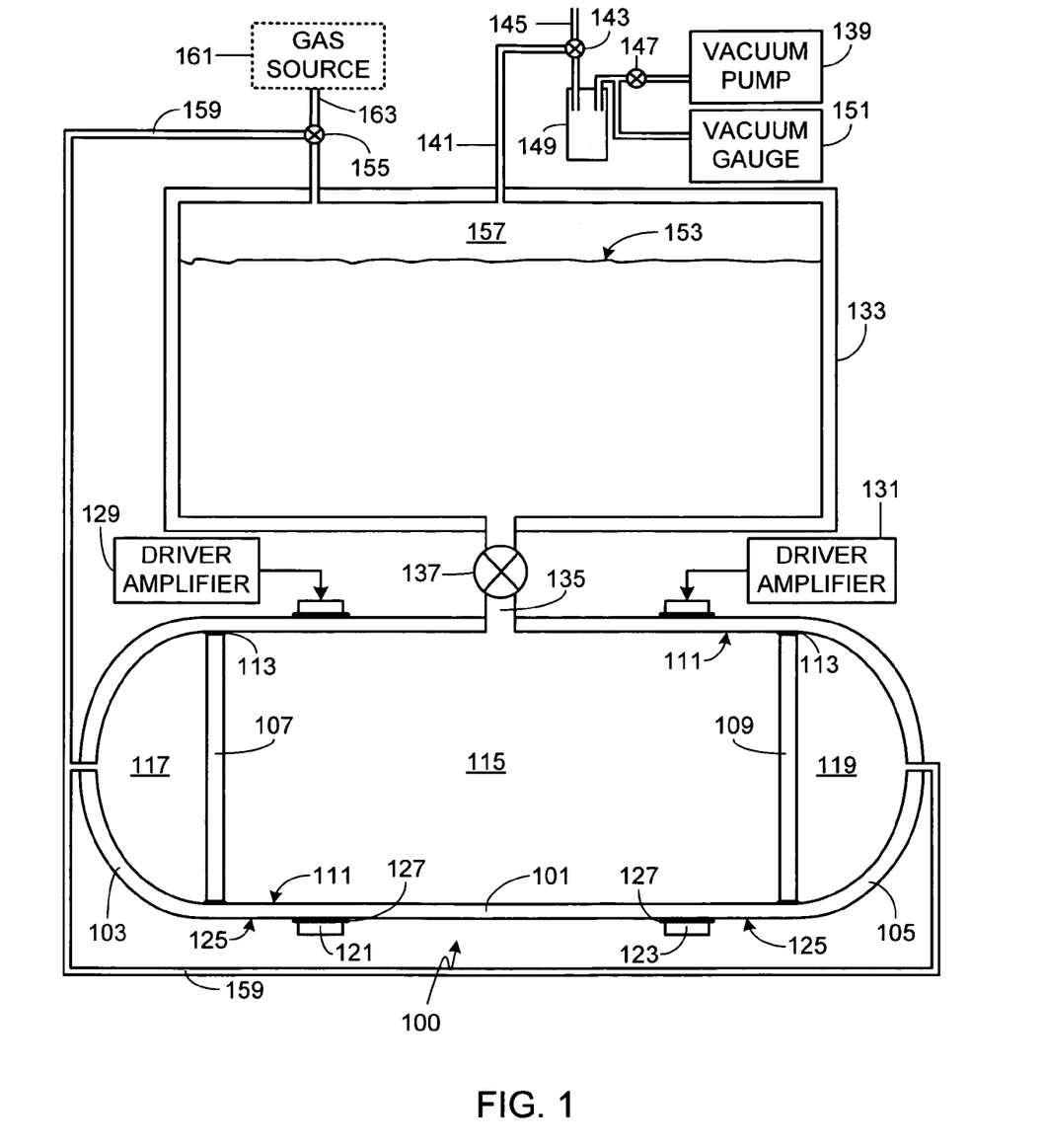
FIG. 1 is a cross-sectional view of a cavitation chamber and dual reflector assembly according to the invention.

FIG. 1 is an illustration of a cavitation chamber and dual reflector assembly according to the invention. In this embodiment, the cavitation chamber is a cylindrically-shaped chamber comprised of a glass cylindrical portion 101 and a pair of glass end portions 103 and 105. There are numerous ways to fabricate a glass vessel such as this chamber including, but not limited to, bonding or otherwise combining multiple glass pieces together. As the fabrication of such a chamber is well within the know-how of those of skill in the art, further vessel fabrication details are not provided herein.

Mounted within, and at either end of chamber 100, are a pair of rigid reflectors 107 and 109. In this embodiment, rigid reflectors 107 and 109 are preferably bonded to inside chamber surface 111 along a bond line 113 using a silicon adhesive and sealant. It will be appreciated that there are numerous bonding/sealing materials that can be used instead of a silicon adhesive/sealant and, more broadly, there are numerous techniques that can be used to attach reflectors 107 and 109 to the inside walls of the cavitation chamber. The primary consideration placed on such a reflector mounting technique is that it is flexible, thus allowing reflectors 107 and 109 to move during the cavitation process. Additionally, it must be capable of providing a leak-proof seal (i.e., both a gas-tight and a liquid-tight seal), thereby preventing cavitation fluid contained within central portion 115 of chamber 100, i.e., between reflectors 107 and 109, from leaking into either chamber portion 117 or chamber portion 119, both of which are devoid of cavitation fluid.

During system operation, cavitation is driven within the cavitation fluid contained within central portion 115 by one or more acoustic drivers. In the embodiment illustrated in FIG. 1, two acoustic drivers 121 and 123, each comprised of a ring of piezoelectric material, are coupled to exterior chamber surface 125. Preferably drivers 121 and 123 are bonded to surface 125 along bond line 127, for example using an epoxy. As in a conventional cavitation chamber, the drivers are coupled to driver power amplifiers 129/131.

In the illustrated embodiment, cavitation chamber 100 is coupled to a cavitation fluid reservoir 133 via conduit 135. In-line valve 137 allows chamber 100 to be isolated from reservoir 133. Degassing, required to efficiently achieve high energy density (e.g., temperature) cavitation induced implosions within the cavitation fluid during cavitation, is performed by a degassing system coupled to reservoir 133. If sufficient degassing is not performed, gas within the cavitation fluid will impede the cavitation process by decreasing the maximum rate of collapse as well as the peak stagnation pressure and temperature of the plasma within the cavitating bubbles. It will be understood that the term "gas", as used herein, refers to any of a variety of gases that are trapped within the cavitation fluid, these gases typically reflecting the gases contained within air (e.g., oxygen, nitrogen, argon, etc.). In contrast, "vapor" only refers to molecules of the cavitation fluid that are in the gaseous phase.

In the preferred embodiment of the invention, degassing is performed with a vacuum pump 139 that is coupled to reservoir 133 via conduit 141. A three-way valve 143 allows the system to be coupled to the ambient atmosphere via conduit 145 or to vacuum pump 139. It will be appreciated that three-way valve 143 can be replaced with a pair of two-way valves (not shown). Valve 147 provides a means for isolating the system from pump 139. Preferably a trap 149 is used to insure that cavitation fluid is not drawn into vacuum pump 139 or vacuum gauge 151. Preferably trap 149 is cooled so that any cavitation medium entering the trap condenses or solidifies. Vacuum gauge 151 is used to provide an accurate assessment of the system pressure. If the cavitation system becomes pressurized, prior to re-coupling the system to either vacuum gauge 151 or vacuum pump 139 the cavitation system pressure is bled down to an acceptable level, for example using three-way valve 143.

A cavitation fluid filling system, not shown, is coupled to the system, preferably via reservoir 133, and used to fill the system to the desired level. Although in general the operating level for a particular cavitation chamber is based on obtaining the most efficient cavitation action, preferably in the present invention the cavitation chamber (i.e., chamber 100) is operated in a completely full state. The filling system may utilize a simple fill tube (e.g., conduit 145) or other filling means. Regardless of the method used to fill the system, preferably it is evacuated prior to filling, thus causing the cavitation medium to be drawn into the system (i.e., utilizing ambient air pressure to provide the pressure to fill the system).

Although not required, the filling system may include a circulatory system, such as that described in co-pending U.S. patent application Ser. No. 11/001,720, filed Dec. 1, 2004, entitled Cavitation Fluid Circulatory System for a Cavitation Chamber, the disclosure of which is incorporated herein for any and all purposes. Other components that may or may not be coupled to the cavitation fluid filling and/or circulatory system include bubble traps, cavitation fluid filters, and heat exchange systems. Further descriptions of some of these variations are provided in co-pending U.S. patent application Ser. No. 10/961,353, filed Oct. 7, 2004, entitled Heat Exchange System for a Cavitation Chamber, the disclosure of which is incorporated herein for any and all purposes.

During system degassing, valves 143 and 147 are open, coupling reservoir 133 to pump 139. Additionally, valve 137 is open, thus insuring that cavitation fluid within chamber 100 is degassed as well as the cavitation fluid within the reservoir. To prevent damage to reflectors 107 and 109, the pressure within chamber end regions 117 and 119 is held in equilibrium with the pressure above the free liquid interface 153 in reservoir 133 during the degassing procedure. Preferably pressure equalization is maintained by opening in-line valve 155, thereby coupling regions 117 and 119 to region 157 above free liquid interface 153 via conduit 159.

It will be appreciated that in addition to performing the degassing procedure using vacuum pump 139, and prior to using the cavitation system for its intended purpose, further degassing can be performed, for example via the process of rectified diffusion. Rectified diffusion can be accomplished by cavitating the fluid, the cavitation process tearing vacuum cavities within the cavitation fluid. As the newly formed cavities expand, gas from the fluid that remains after the initial degassing step enters into the cavities. During cavity collapse, however, not all of the gas re-enters the fluid. The gas can then be removed from the system, for example using vacuum pump 139. Depending upon the amount of gas in the cavitation fluid, it may be necessary to form the cavities to be cavitated by neutron bombardment, focusing a laser beam into the cavitation fluid to vaporize small amounts of fluid, by locally heating small regions with a hot wire, or by other means. Further description of applicable degassing procedures are provided in U.S. patent application Ser. No. 11/002,476, filed Dec. 1, 2004, entitled Degassing Procedure for a Cavitation Chamber, and in U.S. patent application Ser. No. 11/244,753, filed Oct. 6, 2005, entitled Cavitation Chamber Degassing System, the disclosures of which are incorporated herein for any and all purposes.

After the cavitation fluid within the system has been degassed, valve 137 is closed, thereby isolating cavitation chamber region 115 from the cavitation fluid reservoir 133. Once the chamber is isolated, regions 117 and 119 are opened to the atmosphere using valve 155. Since reflectors 107 and 109 are flexibly mounted to the cavitation chamber, opening regions 117 and 119 to the atmosphere causes the two reflectors to be forced inwards toward the central region of the chamber, thereby increasing the static pressure within chamber region 115 which, in effect, pretensions the cavitation fluid. Pre-tensioning the cavitation fluid increases the intensity that can be achieved by the cavitation-induced cavity implosions. If further pressure and thus pre-tensioning is desired, a high pressure gas source 161 (e.g., nitrogen gas) can be coupled to conduit 163, thus causing regions 117 and 119 to become further pressurized when valve 155 is open. Source 161 is shown in phantom as it is optional.

Once the cavitation fluid has been degassed and regions 117 and 119 pressurized, either to atmospheric pressure or from a high pressure gas source, cavitation is driven in region 115 by one or more drivers (e.g., drivers 121/123).

Although the chamber shown in the embodiment of FIG. 1 is a cylindrical chamber fabricated from glass, it should be appreciated that the invention is not limited to a particular configuration. Particular configurations are typically selected to accommodate a specific cavitation process and its corresponding process parameters (e.g., cavitation fluid, pressure, temperature, reactants, etc.). Examples of other configurations include spherical chambers, hourglass-shaped chambers, conical chambers, cubical chambers, rectangular chambers, irregularly-shaped chambers, etc. One method of fabricating a suitable spherical chamber is described in detail in co-pending U.S. patent application Ser. No. 10/925,070, filed Aug. 23, 2004, entitled Method of Fabricating a Spherical Cavitation Chamber, the entire disclosure of which is incorporated herein for any and all purposes. Examples of hourglass-shaped chambers are provided in co-pending U.S. patent application Ser. No. 11/140,175, filed May 27, 2005, entitled Hourglass-Shaped Cavitation Chamber, and Ser. No. 11/149,791, filed Jun. 9, 2005, entitled Hourglass-Shaped Cavitation Chamber with Spherical Lobes, the entire disclosures of which are incorporated herein for any and all purposes.

The cavitation chamber of the invention can be fabricated from any of a variety of materials, or any combination of materials. The primary considerations for material selection are the desired operating pressure and temperature of the chamber and system. Preferably the material or materials selected for the cavitation chamber are relatively corrosion resistant to the intended cavitation fluid, thus allowing the chamber to be used repeatedly. Additionally, the chamber materials can be selected to simplify viewing of the sonoluminescence phenomena, for example utilizing a transparent material such as glass, borosilicate glass (e.g., Pyrex®), or quartz glass. Alternately the cavitation chamber can be fabricated from a more robust material (e.g., 17-4 precipitation hardened stainless steel) and one which is preferably machinable, thus simplifying fabrication. Alternately a portion of the chamber can be fabricated from one material while other portions of the chamber can be fabricated from one or more different materials.

Figure 2:
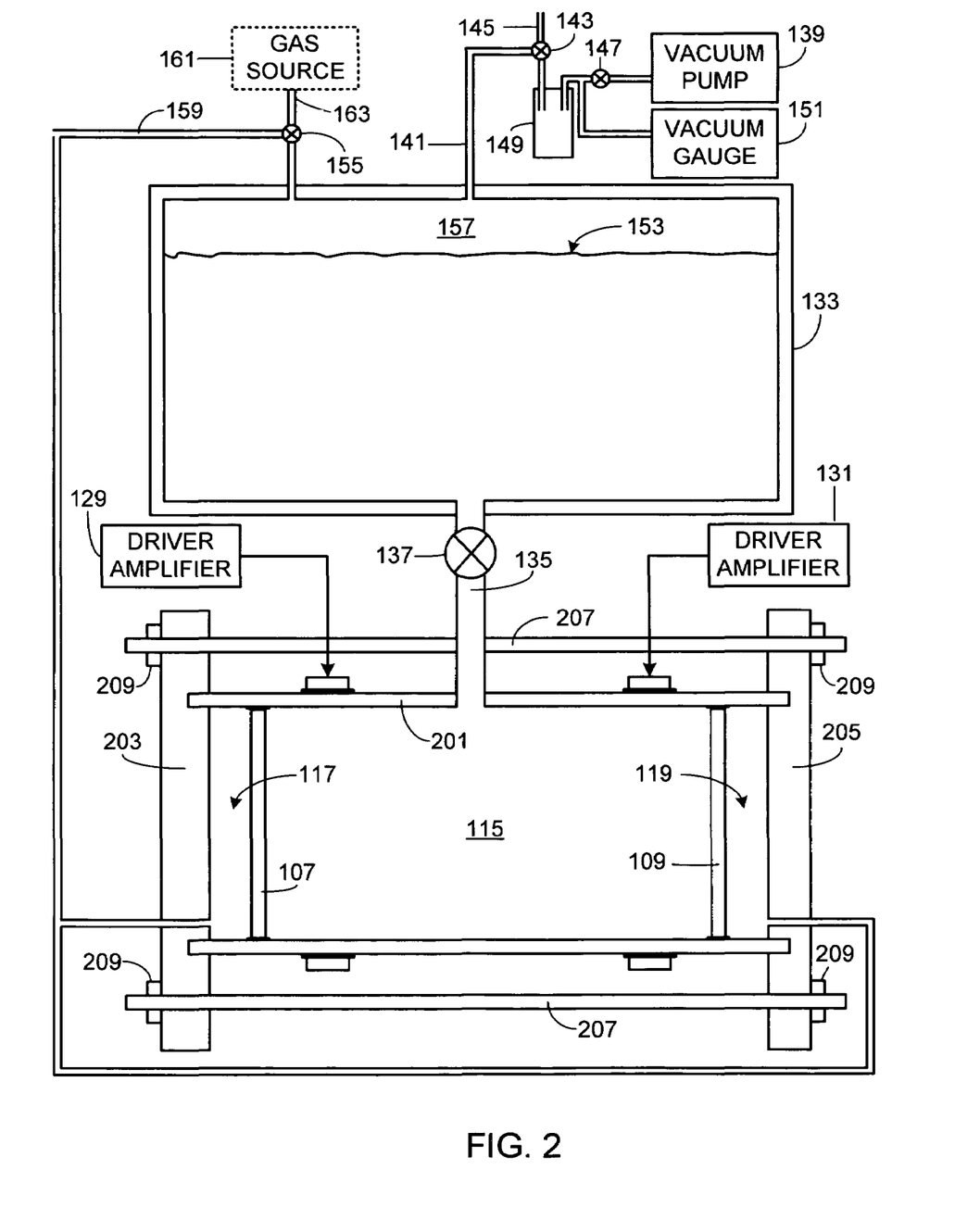
FIG. 2 is a cross-sectional view of an alternate embodiment of a cavitation chamber and dual reflector assembly.

FIG. 2 is an exemplary embodiment of the invention in which the cavitation chamber is fabricated from multiple materials. In particular, cylindrical portion 201 is fabricated from a transparent material (e.g., glass) while end caps 203 and 205 are fabricated from a metal (e.g., aluminum), the assembly being held together with multiple all-threads 207 and nuts 209.

Although reflectors 107 and 109 can be fabricated from any of a variety of materials, preferably the material selected is rigid and relatively light weight. Additionally, reflectors 107 and 109 must be capable of withstanding the pressure waves created by the cavitating bubbles within the cavitation fluid contained within 115. The inventor has found that reflectors 107 and 109 can either be hollow (e.g., a hollow disc) or solid. For example, in one embodiment reflectors 107 and 109 are comprised of a hollow glass disc. In an alternate embodiment, reflectors 107 and 109 are comprised of a solid glass disc. In yet another alternate embodiment, reflectors 107 and 109 are comprised of a hollow metal disc, preferably a titanium hollow disc. In yet another alternate embodiment, reflectors 107 and 109 are comprised of a solid metal disc, preferably a titanium disc. It will be appreciated that glass and titanium are exemplary materials and that the invention is not limited to these materials. Additionally, it should be understood that the shape of the reflectors is driven by the shape of the cavitation chamber, thus reflectors 107 and 109 are disc-shaped only because chamber 100, as well as the chamber of FIG. 2, is cylindrically-shaped.

Although in the embodiments shown in FIGS. 1 and 2 the reflectors are bonded to the inside surface of the chamber using a flexible bonding material such as a silicon adhesive and sealant, the invention is not limited to this particular configuration. For example, the embodiment shown in FIG. 3, based on the embodiment of FIG. 2, uses a neoprene material 301 attached to reflectors 303 and 305, the neoprene material allowing reflector movement while providing the necessary seal between the cavitation fluid within chamber volume 115 and chamber volumes 117 and 119. In the embodiment illustrated in FIG. 3, the inside edge 307 of neoprene flexible seal 301 is bonded to reflectors 303 and 305 along bond joints which are preferably located within grooves within the reflectors. Similarly the outside edge 309 of neoprene flexible seal 301 is bonded to the walls 201 of the cavitation chamber along second bond joints, the second bond joints preferably located within grooves in the cavitation chamber walls. The bond joints can be comprised of any bonding agent (i.e., epoxy, silicon adhesive, etc.) that is capable of bonding to the materials in question (e.g., neoprene, reflector material, chamber wall material) and providing a gas-tight and liquid-tight seal. This bond does not have to be flexible, however, as the required flexibility is provided by neoprene seal 301.

Figure 3:
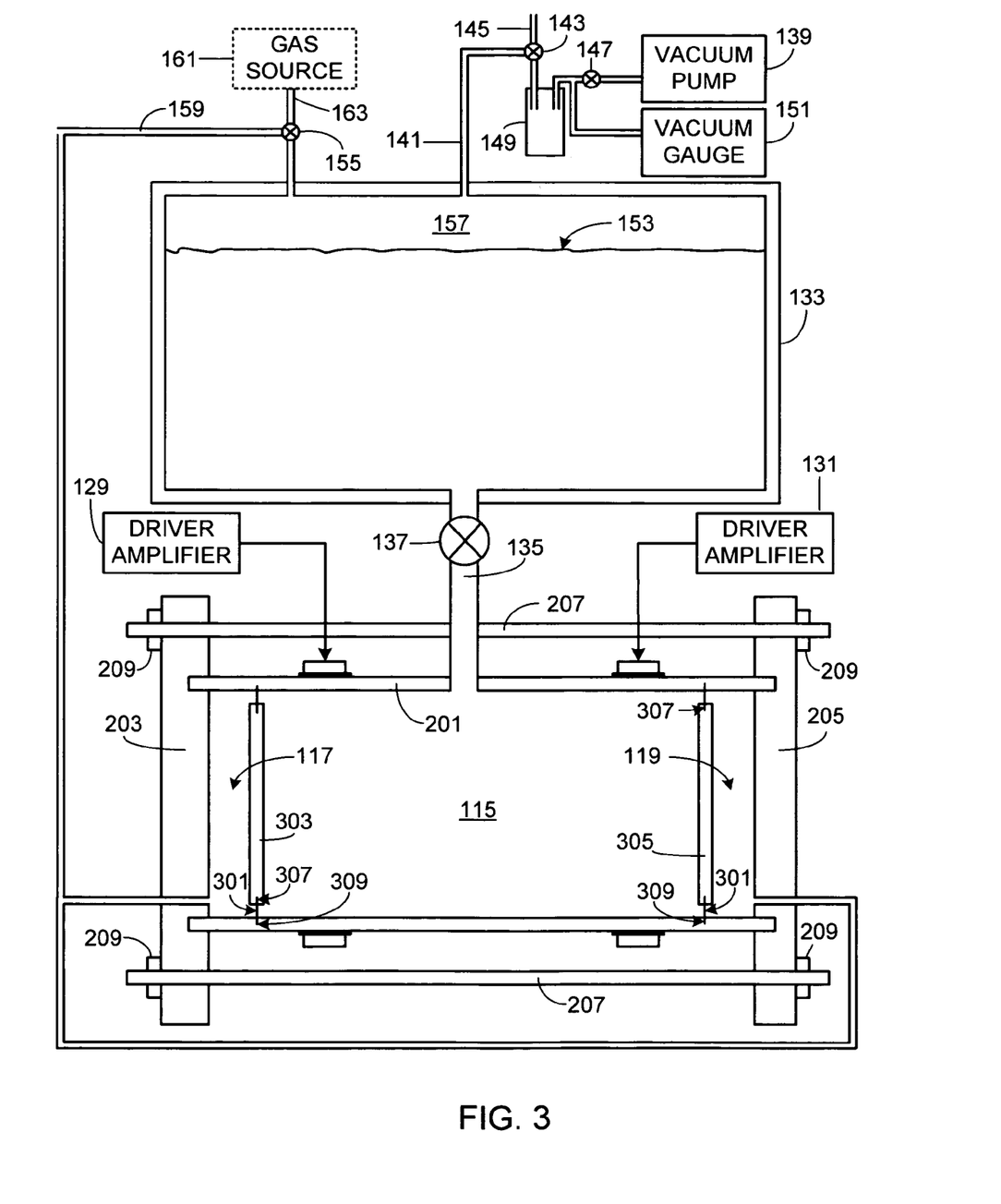
FIG. 3 is a cross-sectional view of a cavitation chamber and reflector assembly similar to that shown in FIG. 2, utilizing a different seal for the dual reflectors.
Figure 4:
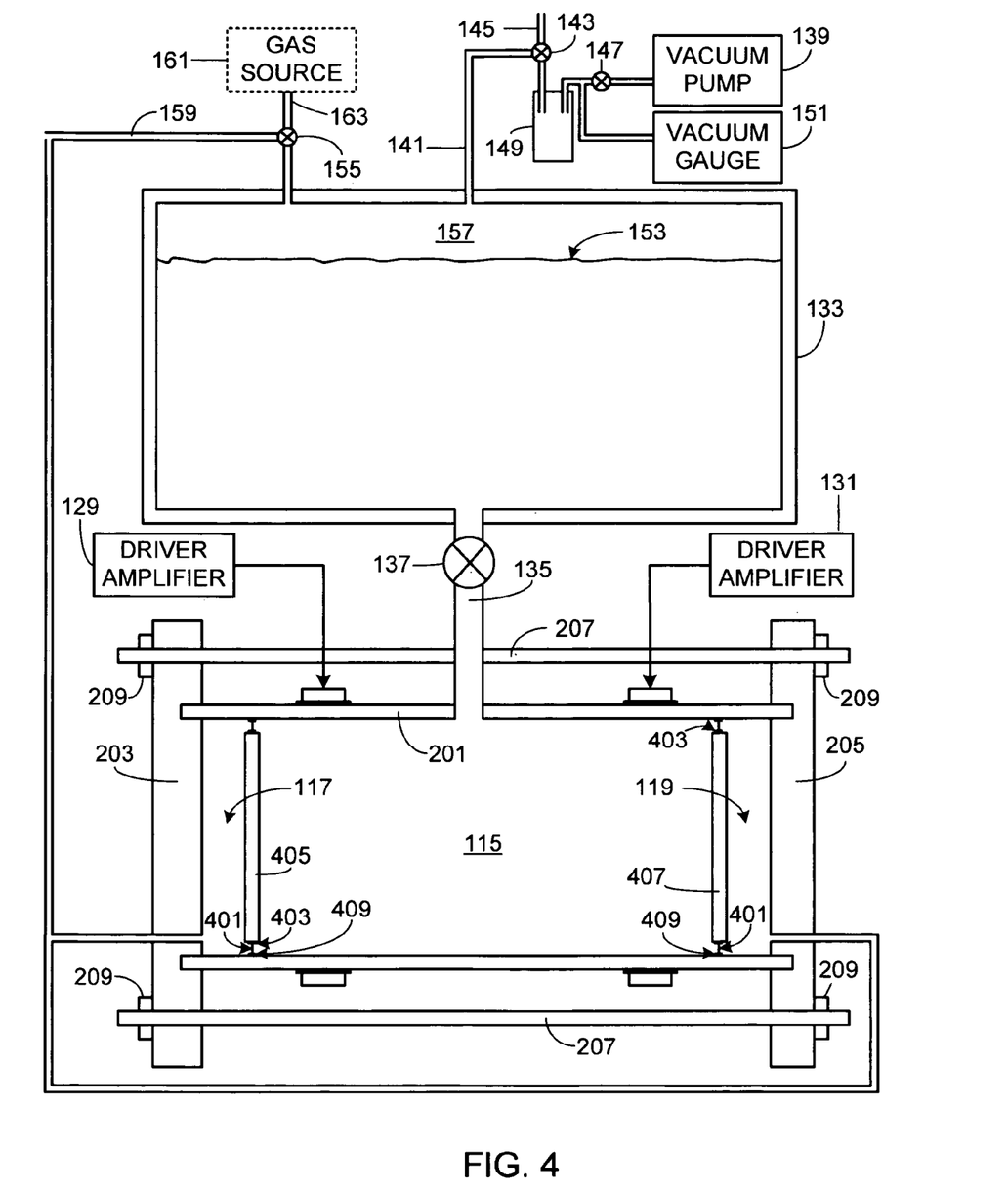
FIG. 4 is a cross-sectional view of a cavitation chamber and reflector assembly similar to that shown in FIG. 2, utilizing a different seal for the dual reflectors.

The embodiment illustrated in FIG. 4 is similar to that shown in FIG. 3, except that flexible neoprene seals 401 include a flange 403 along their inside surfaces, thus allowing the seals to be bonded to the outside circumference of reflectors 405 and 407. Similarly, seals 401 include a flange 409 along their outside surfaces, flange 409 providing a suitable bonding surface to bond the flexible seals to the inside surface of chamber walls 201.

Figure 5:
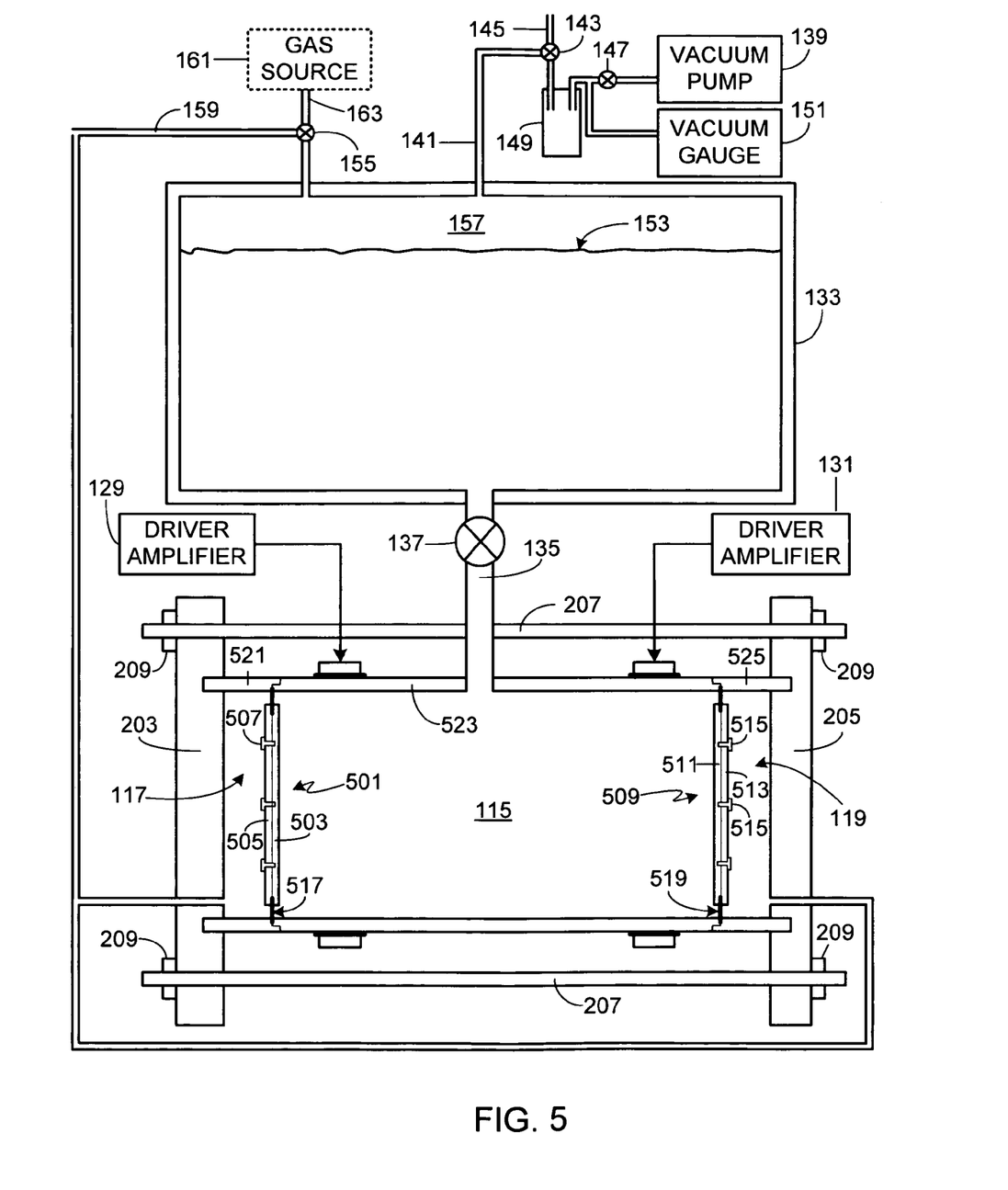
FIG. 5 is a cross-sectional view of a cavitation chamber and reflector assembly similar to that shown in FIG. 2, utilizing a different seal for the dual reflectors.

In the embodiment illustrated in FIG. 5, rigid reflector 501 is comprised of a pair of reflector members 503 and 505 held together with multiple threaded means 507 (e.g., screws, bolts, etc.). Similarly, rigid reflector 509 is comprised of a pair of reflector members 511 and 513, held together with multiple threaded means 515 (e.g., screws, bolts, etc.). Captured in between each pair of reflector members is the inner edge of neoprene flexible seals 517 and 519. The outer edge of neoprene flexible seal 517 corresponding to reflector 501 is captured between first chamber wall member 521 and second chamber wall member 523. Similarly, the outer edge of neoprene flexible seal 519 corresponding to reflector 509 is captured between second wall member 523 and third chamber wall member 525. It will be appreciated that there are numerous methods of designing the mating surfaces of wall members 521/523 and 523/525 that provide both a strong wall and a means of capturing the edges of the seals. The inner and outer portions of seals 517/519 are sealed with a suitable sealant (e.g., silicon adhesive) to the reflector members and the wall members to insure a gas-tight and liquid-tight seal.

In the embodiments illustrated in FIGS. 3-5 seals 301, 401, 517 and 519 are fabricated from neoprene. It should be appreciated, however, that these seals can be fabricated from any of a variety of elastomeric materials, including both natural and synthetic rubbers. In addition to the need for flexibility, the elastomeric material selected for the seal must be corrosion resistant to the intended cavitation fluid and provide both a gas-tight and liquid-tight seal. Preferably the selected material is also readily bondable, thus providing a simple method of bonding the seal to both the reflector and the chamber wall.

Figure 6:
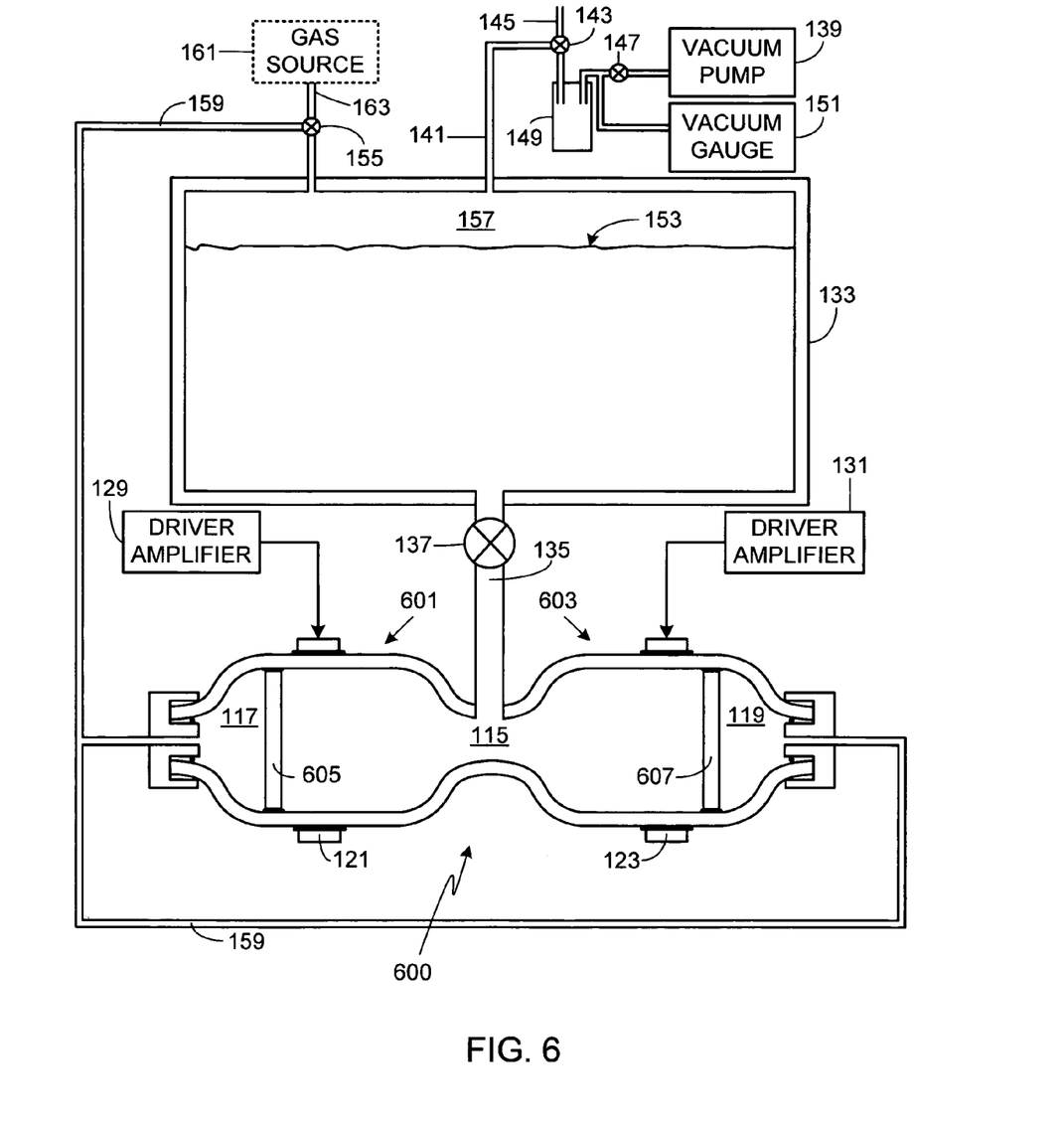
FIG. 6 is a cross-sectional view of a dual lobe cavitation chamber and dual reflector assembly.

As previously noted, the use of a reflector as described herein is not limited to the illustrated embodiments. For example, non-cylindrical cavitation chambers can be used with the invention such as the chamber shown in FIG. 6. Chamber 600 includes a pair of lobes 601/603, each of which includes a reflector, i.e., reflectors 605/607, respectively.

Figure 7:
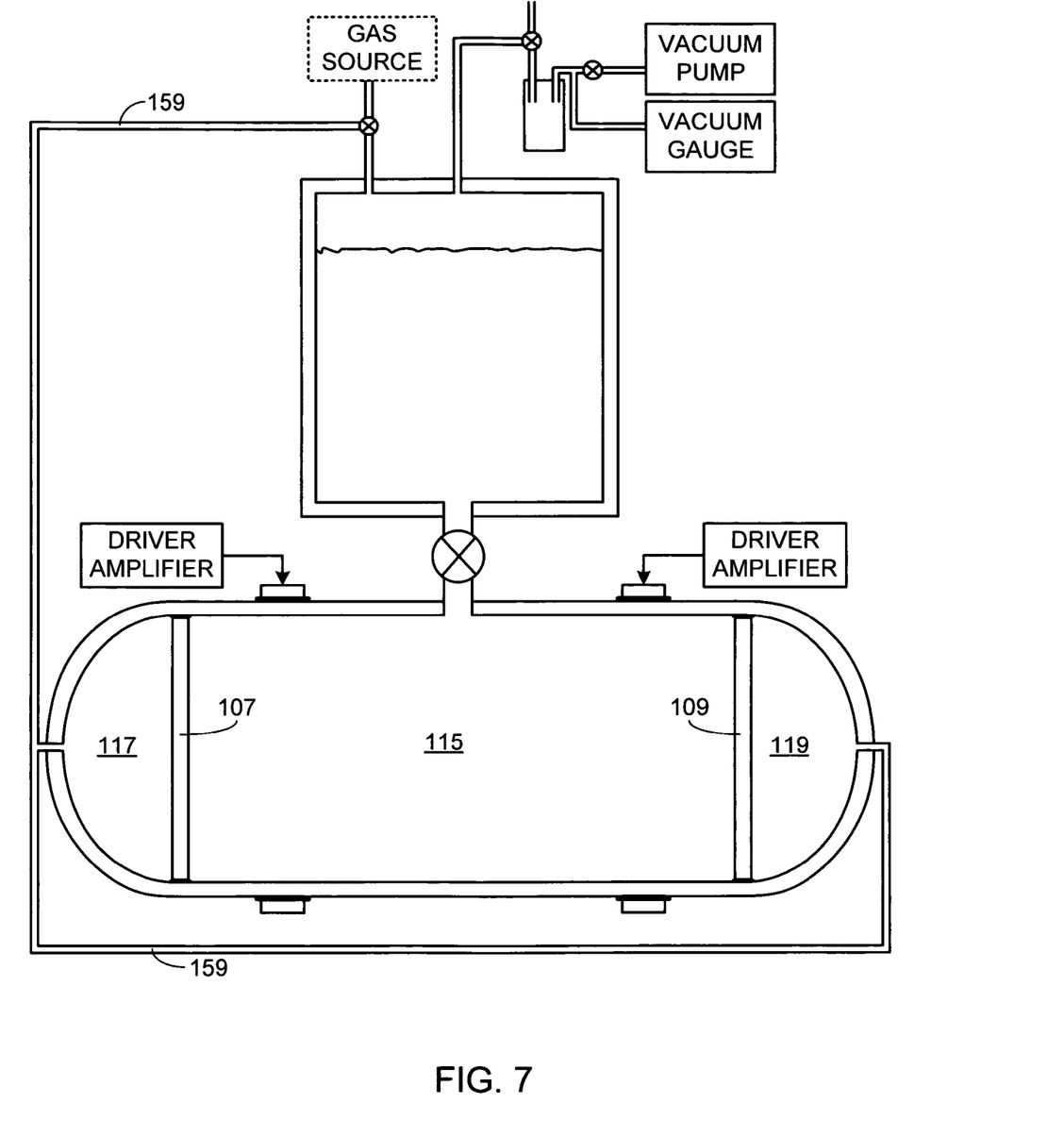
FIG. 7 is a cross-sectional view of a cavitation chamber and reflector assembly identical to that shown in FIG. 1 utilizing a different cavitation fluid reservoir.

In order to simplify chamber filling and the degassing operation, in the preferred embodiments of the invention cavitation fluid reservoir 133 is large enough to hold sufficient cavitation fluid to completely fill the cavitation chamber to which it is attached as well as remain partially filled. This arrangement, however, is not required. For example, the embodiment shown in FIG. 7 is the same as that shown in FIG. 1, except for the size of the cavitation fluid reservoir. In this arrangement, the chamber is completely filled and the reservoir is partially filled prior to performing the degassing operation.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of operating a cavitation system comprising the steps of:
    dividing a cavitation chamber into a least three separate cavitation chamber volumes using at least two volume dividers, said dividing step further comprising the steps of:
        fabricating a first gas-tight and liquid-tight volume divider from a first rigid reflector and a first flexible member;
        installing said first gas-tight and liquid-tight volume divider between a first cavitation chamber volume and a second cavitation chamber volume;
        fabricating a second gas-tight and liquid-tight volume divider from a second rigid reflector and a second flexible member; and
        installing said second gas-tight and liquid-tight volume divider between said second cavitation chamber volume and a third cavitation chamber volume; and
    filling said second cavitation chamber volume with cavitation fluid;
    isolating said second cavitation chamber volume;
    maintaining said first cavitation chamber volume and said third cavitation chamber volume devoid of cavitation fluid;
    pressurizing said first cavitation chamber volume and said third cavitation chamber volume to a first pressure, wherein said first pressure is greater than a second pressure corresponding to said second cavitation chamber volume; and
    driving cavitation within said second cavitation chamber volume.

2. The method of claim 1, further comprising the step of degassing said cavitation fluid within said second cavitation chamber volume prior to performing said isolating step.

3. The method of claim 1, wherein said filling step further comprises the step of filling said second cavitation chamber volume from a cavitation fluid reservoir.

4. The method of claim 3, further comprising the step of degassing said cavitation fluid within said cavitation fluid reservoir and said second cavitation chamber volume, wherein said degassing step is performed prior to performing said isolating step.

5. The method of claim 4, further comprising the steps of:
    coupling said first cavitation chamber volume to said third cavitation chamber volume, wherein said coupling step allows pressure equalization between said first cavitation chamber volume and said third cavitation chamber volume;
    coupling said first and third cavitation chamber volumes to a region within said cavitation fluid reservoir, wherein said region is located above a liquid free surface within said cavitation fluid reservoir, and wherein said coupling step allows pressure equalization between said first and third cavitation chamber volumes and said region within said cavitation fluid reservoir; and wherein said coupling steps are performed prior to performing said degassing step.

6. The method of claim 4, further comprising the steps of:
coupling said first cavitation chamber volume to said third cavitation chamber volume, wherein said coupling step allows pressure equalization between said first cavitation chamber volume and said third cavitation chamber volume;
coupling said first and third cavitation chamber volumes to a region within said cavitation fluid reservoir, wherein said region is located above a liquid free surface within said cavitation fluid reservoir, and wherein said coupling step allows pressure equalization between said first and third cavitation chamber volumes and said region within said cavitation fluid reservoir; and
wherein said coupling steps are performed after initiating said degassing step.

7. The method of claim 4, further comprising the steps of:
coupling said first cavitation chamber volume to said third cavitation chamber volume, wherein said coupling step allows pressure equalization between said first cavitation chamber volume and said third cavitation chamber volume;
coupling said first and third cavitation chamber volumes to a region within said cavitation fluid reservoir, wherein said region is located above a liquid free surface within said cavitation fluid reservoir, and wherein said coupling step allows pressure equalization between said first and third cavitation chamber volumes and said region within said cavitation fluid reservoir; and
wherein said coupling steps are performed after completing said degassing step.

8. The method of claim 1, said pressurizing step further comprising the step of coupling said first cavitation chamber volume and said third cavitation chamber to the ambient atmosphere.

9. The method of claim 1, said pressurizing step further comprising the step of coupling said first cavitation chamber volume and said third cavitation chamber to a high pressure gas source.

10. The method of operating a cavitation system comprising the steps of:
dividing a cavitation chamber into a least a first cavitation chamber volume, a second cavitation chamber volume, and a third cavitation chamber volume;
coupling said second cavitation chamber volume to a cavitation fluid reservoir;
filling said second cavitation chamber volume with a cavitation fluid contained within said cavitation fluid reservoir;
maintaining said first cavitation chamber volume and said third cavitation chamber volume devoid of cavitation fluid;
coupling said first cavitation chamber volume to said third cavitation chamber volume, wherein said coupling step allows pressure equalization between said first cavitation chamber volume and said third cavitation chamber volume;
coupling said first and third cavitation chamber volumes to a region within said cavitation fluid reservoir, wherein said region is located above a liquid free surface within said cavitation fluid reservoir, and wherein said coupling step allows pressure equalization between said first and third cavitation chamber volumes and said region within said cavitation fluid reservoir;
degassing said cavitation fluid within said cavitation fluid reservoir and said second cavitation chamber volume;
isolating said second cavitation chamber volume from said cavitation fluid reservoir;
isolating said first and third cavitation chamber volumes from said region within said cavitation fluid reservoir;
pressurizing said first cavitation chamber volume and said third cavitation chamber volume to a first pressure, wherein said first pressure is greater than a second pressure corresponding to said second cavitation chamber volume; and
driving cavitation within said second cavitation chamber volume.

11. The method of claim 10, wherein said step of coupling said first and third cavitation chamber volumes to said region within said cavitation fluid reservoir is performed after initiating said degassing step.

12. The method of claim 10, wherein said step of coupling said first and third cavitation chamber volumes to said region within said cavitation fluid reservoir is performed after completing said degassing step.

13. The method of claim 10, said pressurizing step further comprising the step of coupling said first cavitation chamber volume and said third cavitation chamber to the ambient atmosphere.

14. The method of claim 10, said pressurizing step further comprising the step of coupling said first cavitation chamber volume and said third cavitation-chamber to a high pressure gas source.

* * * * *